United States Patent
Van endert

(10) Patent No.: US 8,014,243 B2
(45) Date of Patent: Sep. 6, 2011

(54) METHOD AND APPARATUS FOR PERFORMING BETA PREDICTION FOR HIGH-SPEED WRITING ON UNKNOWN RECORDABLE OPTICAL DISCS

(75) Inventor: Tony Petrus Van endert, Lommel (BE)

(73) Assignee: Koninklijke Philips Electronics N.V., Eindhoven (NL)

( * ) Notice: Subject to any disclaimer, the term of this patent is extended or adjusted under 35 U.S.C. 154(b) by 241 days.

(21) Appl. No.: 12/377,142

(22) PCT Filed: Jul. 24, 2007

(86) PCT No.: PCT/IB2007/052940
§ 371 (c)(1),
(2), (4) Date: Feb. 11, 2009

(87) PCT Pub. No.: WO2008/020352
PCT Pub. Date: Feb. 21, 2008

(65) Prior Publication Data
US 2010/0177609 A1    Jul. 15, 2010

Related U.S. Application Data

(60) Provisional application No. 60/822,389, filed on Aug. 15, 2006.

(51) Int. Cl.
*G11B 5/00* (2006.01)
*G11B 7/12* (2006.01)
*G11B 5/52* (2006.01)
(52) U.S. Cl. .................. 369/47.53; 369/53.3
(58) Field of Classification Search ........... 369/47.53
See application file for complete search history.

(56) References Cited

U.S. PATENT DOCUMENTS

| | | |
|---|---|---|
| 2002/0001270 A1 | 1/2002 | Fukuchi et al. |
| 2002/0105874 A1 | 8/2002 | Matsumoto |
| 2003/0053388 A1 | 3/2003 | Ogawa |
| 2003/0067852 A1 | 4/2003 | Tsukihashi et al. |
| 2003/0156513 A1 | 8/2003 | Tseng et al. |
| 2003/0198155 A1 | 10/2003 | Go et al. |
| 2005/0185537 A1 | 8/2005 | Ninomiya |

FOREIGN PATENT DOCUMENTS

| | | |
|---|---|---|
| EP | 1351225 A2 | 10/2003 |
| EP | 1383117 A2 | 1/2004 |
| JP | 2005116027 | 4/2005 |
| JP | 2006012343 | 1/2006 |
| WO | 2005052934 A2 | 6/2005 |
| WO | 2005093732 A1 | 10/2005 |
| WO | WO 2005093732 A1 * | 10/2005 |
| WO | 2005109418 A1 | 11/2005 |
| WO | 2006-043572 A1 | 4/2006 |
| WO | 2006097873 A2 | 9/2006 |

* cited by examiner

*Primary Examiner* — Joseph H Feild
*Assistant Examiner* — Nicholas Lee

(57) ABSTRACT

A method is disclosed for performing Beta prediction for high-speed writing on unknown recordable optical discs. Test recordings are performed in the inner (20) and outer test (40) zones of an unknown recordable optical disc, yielding results expressed as measured beta target values. At least one beta target value is computed in a data zone (30) of the unknown recordable optical disc. Beta (power) is predicted as a function of speed for continuous angular velocity (CAV) speed profiles, or equivalently, as a function of disc radius for CAV writing, for high speed writing on said unknown optical disc by constructing a piecewise linear interpolation of beta versus speed or disc radius using the measured target values and the at least one calculated beta target value.

16 Claims, 4 Drawing Sheets

METHOD AND APPARATUS FOR PERFORMING BETA PREDICTION FOR HIGH-SPEED WRITING ON UNKNOWN RECORDABLE OPTICAL DISCS

The present invention relates generally to optical storage systems, and more specifically to a method of and apparatus for to predicting beta (power) as a function of speed for continuous angular velocity (CAV) speed profiles, or equivalently, as a function of disc radius for CAV writing, for high speed writing on unknown recordable optical discs.

Data storage on optical media has been a rapidly developing technology limited in part by the ability to precisely write waveform information to the media at high speeds. To maximize the amount of data which may be stored on optical media, the laser-generated pulses must be formed with precisely selected laser power, as well as position information.

The correct amount of laser power needed for optical media recording is variable and depends on both the individual recorder, media and sometimes even the specific location on the media. Moreover, due to their physical makeup, the various types of materials used in optical media have different sized power windows (i.e., the range of laser energy that will properly form the correct sized pulses on the media) and therefore require different amounts of laser power for proper recording. Power windows can vary not only between the type of media used, but also upon the speed at which the data is being recorded. This is significant since too much power will create oversized pulses, while too little power will produce undersized marks.

In the case of the recorder, the size and optical quality of the laser it uses for writing varies from unit to unit as does its wavelength, which can change depending upon temperature and other environmental conditions. The emission frequency of most lasers is temperature sensitive, and thus writing performed at the extremes of the allowable operational temperature range can result in a significant spread of wavelengths. Consequently, many recorders perform an initial Optimum Power Calibration (OPC) procedure to determine the best writing laser power setting for each disc and recorder combination. In addition, an Automatic Power Control (APC) loops have been employed to overcome very slow changes due to aging and thermal shifts.

Standards for CD, DVD, and Blue Ray discs specify a standard linear speed (so called 1× speed) for a constant linear velocity (CLV) mode of operation and suggest that a laser write power variable be written on the disc or determined by testing. However, it has been popular to provide recorders operating at higher than a 1× speed in a CAV mode. The speed claimed for CAV mode is the multiple of the standard speed at the outside edge of the disc. So a recorder operating at 16× actually operates at a linear speed of 6.3× at the inner edge of the disc and 16× at the outer edge of the disc.

As a method for controlling a write laser power to be optimum in accordance with a recording velocity magnification, the OPC method of implementing an optimum power control has been proposed which comprises: performing a test recording with a plurality of writing laser power values in a predetermined area in an optical disc prior to a regular recording; and obtaining a writing laser power value from a reproduction result of the test recording area.

In the conventional OPC, a writing laser power value/β value characteristic indicating a relation between the writing laser power value and the β value is obtained from a reproduced signal from a test record area, and is referred to, and the writing laser power value corresponding to a predetermined optimum β value is employed, sometimes referred to as a β target value, as an optimum writing laser power value. Additionally, the β value is a parameter relating to a reproduced signal level or amplitude, and is obtained by (a+b)/(a−b) in which character a denotes a peak level (with a sign of +) of an eight to fourteen modulation (EFM) signal waveform as a returned light receiving signal of an optical pickup, and b (with a sign of −) denotes a bottom level of the returned signal.

A well known procedure for making such a "beta target" measurement in a conventional OPC includes the steps of: (1) performing an OPC to derive an optimum laser write power, Pw_opt, (2) writing a single track (i.e., 1 disc revolution) using the derived optimum laser write power, Pw_opt, (3) measuring N amplitudes of the written track (at a read laser power, Pr) $A1_0 \ldots A1_{N-1}$ and $A2_0 \ldots A2_{N-1}$ at 1 disc revolution, calculating different beta values $$\beta_i = \frac{A1_i - A2_i}{A1_i + A2_i}$$

for i:0→N−1 and (4) calculating an average beta target estimate $$\beta_{target} = \frac{\sum_{i=0}^{N-1} \beta_i}{N}.$$

Additionally, in a conventional OPC, the writing laser power value corresponding to the predetermined optimum β value is determined. That is, the writing laser power value is determined considering only the β value. However, when a characteristic of the optical disc differs from a type to type, a quality level of a recording state is deteriorated during recording with the writing laser power value determined simply by considering only the β value. For example, a relation between the writing laser power value and the β value is usually substantially linear, but sometimes turns to a nonlinear relation shown in FIG. 1 because of distortion, dyestuff unevenness, and the like of the optical disc. As shown in FIG. 1, in the optical disc, the relation between the β value and the writing laser power value has a substantially non-linear characteristic. Specifically, the relationship of β as a function of speed, is non-linear. Therefore, for unknown discs (i.e., discs that do not include information regarding indicative power levels with which to begin an OPC procedure) write errors will be made based on wrong beta target values due to linear interpolation 5.

Presently used OPC methods to correct disc nonlinear relations between the writing laser power and the β value is based upon information being used which is pre-stored on the disc (see for example DVD+R, Basic Format Specification, Systems Description, or Recordable Compact Disc Systems, Part II: CD-R, System Description). Information may be pre-stored onto a disc which provides a recorder for example with an indicative power level with which to begin an OPC procedure. This information, may not, however, always be available for a number of high speed recordable discs. In particular, the information is not available for those discs not mentioned in the media table.

Therefore, there is a need in the art for a procedure to perform power regulation for writing electronic data on an optical disc apparatus in those cases where an optical disc apparatus does not include information regarding indicative power levels with which to begin an OPC procedure.

The present invention relates to predicting beta (power) as a function of speed for continuous angular velocity (CAV) speed profiles, or equivalently, as a function of disc radius for CAV writing, of an optical disc apparatus, which may be executed at inner and outer test zones of a disc, and which overcomes the problems associated with conventional OPC procedures.

According to a first aspect of the present invention, a method is provided for predicting beta as a function of linear speed for CAV profiles, or disc radius for CAV writing, for writing electronic data on an optical disc, comprising the steps of: (a) performing a plurality of test recordings of signals in an outer test zone of the optical disc at a plurality of predetermined recording velocities, wherein the test recordings is expressed in terms of an outer test zone measured beta target value obtained from a read laser beam reflected back from the power of a writing laser beam; (b) calculating at least one beta target values in a data zone of the optical disc at a predetermined recording velocity; and (c) predicting beta (power) as a function of linear speed for continuous angular velocity (CAV) speed profiles, or equivalently, as a function of disc radius for CAV writing, for high speed writing on the optical disc, for other linear speeds than the predetermined recording velocities, the predicting depending on the at least one calculated beta target value and the test recordings including test recording at at least two different predetermined recording velocities.

The present invention will now be described in more detail in relation to the enclosed drawings, in which.

Figure 2:
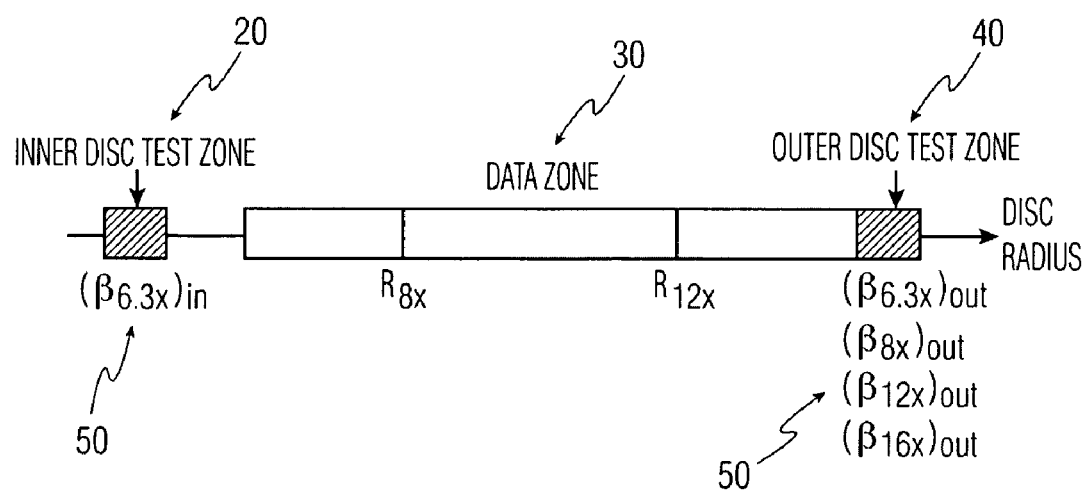
FIG. 2 represents a side view of a typical optical disc.

FIG. 2 shows a simplified side view of a standard disc. The inner disc test zone 20 and outer disc test zone 40 represent the innermost and outermost zones of the disc, respectively. Only these test zones can be used by the drive for performing disc tests and OPC algorithms. The data zone 30 constitutes the recordable area in which the information is recorded using a non-reversible effect.

According to an exemplary embodiment of the present invention, which writes, for example, in a CAV mode of 16×, a single test recording of a signal is performed in the inner disc test zone 20 of the optical disc at a predetermined recording velocity (e.g., 6.3× in the present embodiment) and four additional test recordings of signals are performed in the outer disc test zone 40 of the optical disc at predetermined recording velocities (e.g., 6.3×, 8×, 12×, and 16× in the present embodiment).

The five test recordings, one test recording performed in the inner test zone and four test recordings performed in the outer test zone, are preferably expressed in terms of a beta target value 50 (i.e., power), as shown in FIG. 2, obtained from a read laser beam reflected back from the power of a writing laser beam. Such test recording measurements are well known and are routinely performed in a test zone of an optical disc.

Subsequent to performing the five test recordings and acquiring the five measured beta target values, at least one beta target value is calculated at an inner recording velocity. In the present embodiment, two beta target values are calculated at recording velocities of 8× and 12×. In general, beta target values may be calculated in accordance with the following equation:

$$\beta t_x = \beta t_{out\_x} + \Delta\beta \cdot \frac{\text{Ropc\_out} - R_x}{\text{Ropc\_out} - \text{Ropc\_in}} \quad (1)$$

It is observed from equation (1) that the first term for calculating a beta target value, $\beta t_x$ at a recording velocity x, is the measured beta target value, $\beta t_{out\_x}$ obtained by performing a test recording in an outer test zone of the disc at a recording velocity x, as described above. The measured beta target value, $\beta t_{out\_x}$, is considered a speed dependent component of equation (1), described as follows.

Equation (1) can be considered to be comprised of two components, a speed dependent component $\beta t_{out\_x}$, and a disc dependent component. The speed dependent component, $\beta t_{out\_x}$, is a beta target value measured at the outer disc test zone 40 at a particular recording velocity x. The disc dependent component is represented by the second term of equation (1):

$$\Delta\beta \cdot \frac{\text{Ropc\_out} - R_x}{\text{Ropc\_out} - \text{Ropc\_in}} \quad (2)$$

Where $R_{opc\_out}$ and $R_{opc\_in}$ represent the radius of the outside and inside test areas of the optical disc, respectively. Typical values of $R_{opc\_out}$ and $R_{opc\_in}$ for a DVD+R Single Layer type of disc are 22.6 mm for $R_{opc\_in}$ and 58.1 mm for $R_{opc\_out}$. $R_x$ represents the disc radius where you are recording at a particular moment.

Δβ represents the difference between beta (power) at the inside and outside disc radius at a certain speed (e.g., 6.3×), calculated as follows:

$$\Delta\beta = \beta t_{in\_6.3} - \beta t_{out\_6.3} \quad (3)$$

As will be described below, according to one embodiment, at least one computed beta target value is combined with at least two measured beta target values to construct a piecewise linear graph for predicting a range of beta target values as a function of speed for continuous angular velocity (CAV) speed profiles, or equivalently, as a function of disc radius for CAV writing, for high speed writing on unknown recordable optical discs. It should be noted that in certain embodiments, the piecewise linear graph may be constructed using all calculated beta target values. It is observed, however, that this is unnecessary in that certain beta target values, measured in the test zone are equivalent to their calculated values, as will be described as follows. It is therefore only required to calculate those beta target values which are not equivalent to their measured values.

In the present exemplary embodiment, five beta target values are measured, one in the inner test zone of the optical disc, $\beta t_{in\_6.3x}$, and four in the outer test zone of the optical disc, $\beta t_{out\_6.3x}$, $\beta t_{out\_8x}$, $\beta t_{out\_12x}$, and $\beta t_{out\_16x}$ (see FIG. 2). In addition to the five measured values, two beta target values are calculated $\beta t_{8x}$, and $\beta_{12x}$.

In the present embodiment, it is appreciated that two of the five measured beta target values, $\beta t_{in\_6.3x}$, and $\beta t_{out\_16x}$, have computed or predicted values which are equal to their measured values. As such, these two measured values may be used in lieu of performing a calculation.

This equivalence of measured and calculated beta target values, may be demonstrated by way of example with regard to equation (4). Equation (4) is the result of calculating a beta target value, in accordance with equation (1), for a boundary recording velocity of 6.3x. As shown, the calculated result (LHS) is equal to the inner test zone measured result (RHS).

$$\beta t_{6.3x} = \beta t_{out\_6.3x} + \Delta\beta = \beta t_{in\_6.3x} \quad (4)$$

This equivalence may be exploited by the method of the invention to reduce the number of required calculations to construct a predictive piecewise linear graph.

Figure 3:
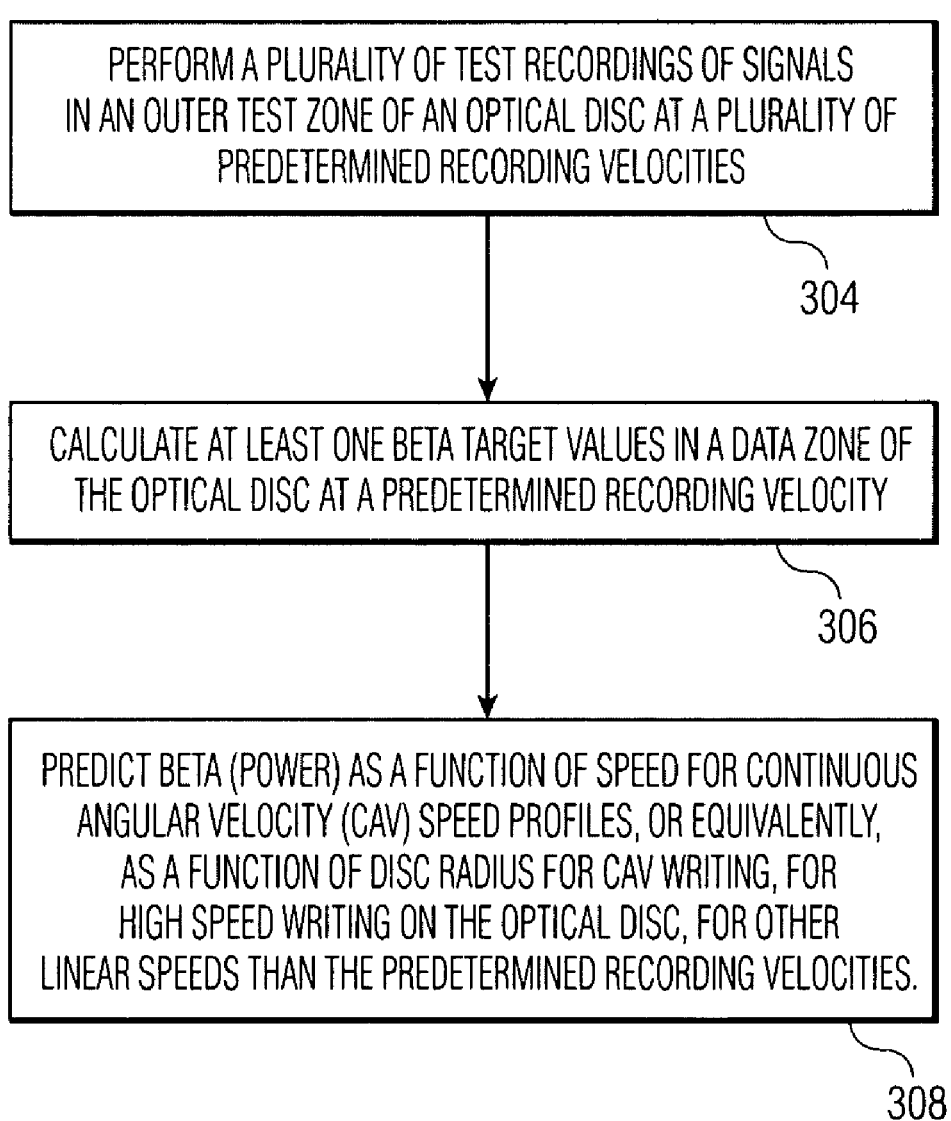
FIG. 3 is a flow chart of the method of the present invention.

With reference now to FIG. 3, and elements of FIG. 2, a flow chart of a method for predicting beta (power) as a function of speed (or disc radius) of an optical disc will now be presented.

According to a preferred embodiment of the present invention, a method for predicting beta (power) as a function of speed for continuous angular velocity (CAV) speed profiles, or equivalently, as a function of disc radius for CAV writing, for high speed writing on unknown recordable optical discs includes the following steps.

At step 302, a single test recording is performed in an inner test zone 20 of the disc (see FIG. 2) at a predetermined recording velocity (e.g., 6.3x in the present embodiment), to obtain a first measured beta target value of $\beta_{in\_6.3x}$. In the present exemplary embodiment, a single test recording is performed at a recording velocity of 6.3x, in the inner test zone 20 of the disc to acquire a single measured beta target value of $\beta t_{in\_6.3x}$.

At step 304, at least two additional test recordings are performed in the outer test zone 40 of the disc (see FIG. 2) at predetermined recording velocities to obtain at least two corresponding measured beta target values. In the present exemplary embodiment, four additional test recordings are performed at recording velocities of 6.3x, 8x, 12x and 16x, in the outer test zone 40 of the disc (see FIG. 2) to acquire four measured beta target values: $\beta t_{out\_6.3x}$, $\beta t_{out\_8x}$, $\beta t_{out\_12x}$, and $\beta t_{out\_16x}$. In the present exemplary embodiment, the measured values $\beta t_{out\_6.3x}$, and $\beta t_{out\_16x}$ are equal to their calculated or predictive value, as computed by equation (1). These values are referred to herein as lower and upper boundary values.

At step 306, for those measured beta target values that are not equal to their calculated or predictive value, a predictive or calculated beta target value calculation is performed. In the present exemplary embodiment, two beta target values, are considered to be non-boundary (inner) recording velocities, i.e., 8x and 12x, for which the following computations are performed, according to equation (1).

$$\beta t_{8x} = \beta t_{out\_8x} + \Delta\beta \cdot \frac{\text{Ropc\_out} - R_{8x}}{\text{Ropc\_out} - \text{Ropc\_in}} \quad (5)$$

$$\beta t_{12x} = \beta t_{out\_12x} + \Delta\beta \cdot \frac{\text{Ropc\_out} - R_{12x}}{\text{Ropc\_out} - \text{Ropc\_in}} \quad (6)$$

Figure 4:
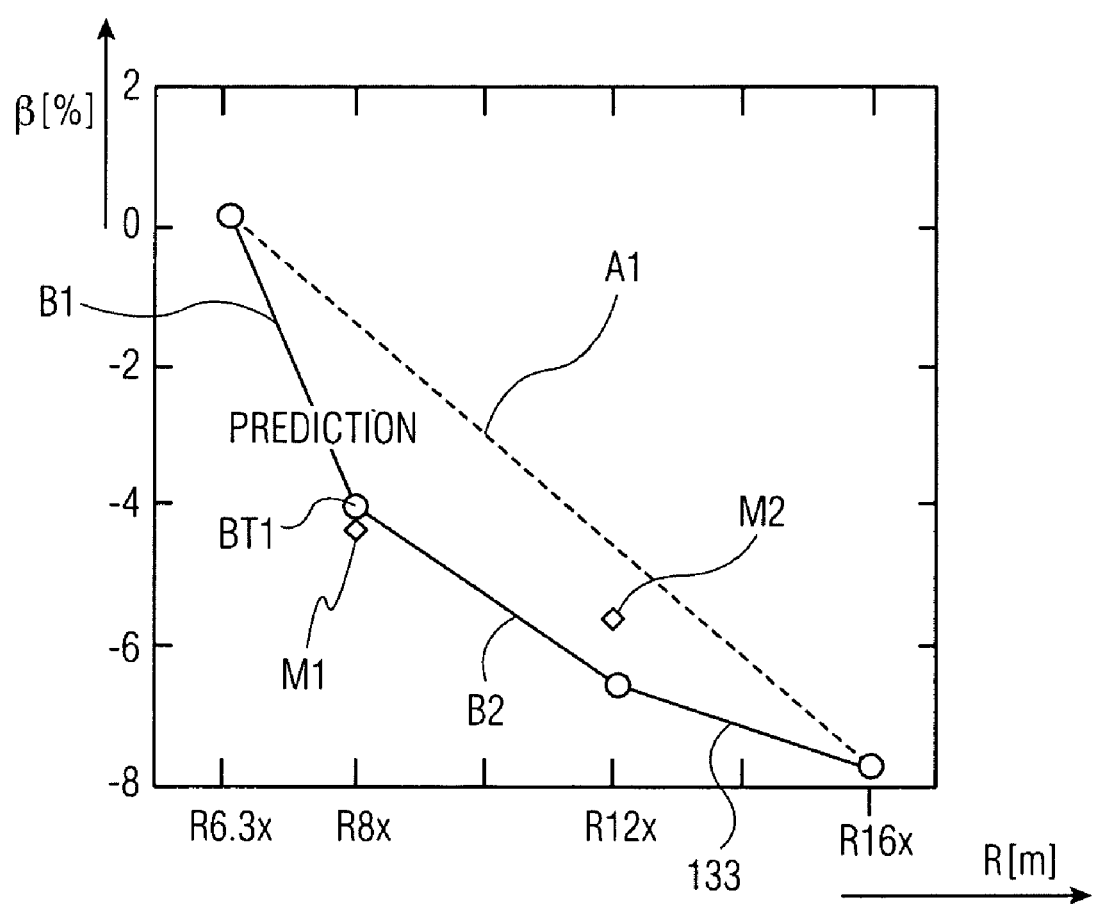
FIG. 4 is a graph showing a relationship of beta (power) versus recording velocity for an exemplary embodiment of the present invention.

At step 308, after a control unit of the optical disc has calculated the beta target values $\beta t_{8x}$, and $\beta t_{16x}$ at the inner recording velocities of 8x and 12x, respectively, the calculated beta target values are used together with the measured boundary beta target values to construct a piecewise linear graph for predicting beta (power) as a function of speed for continuous angular velocity (CAV) speed profiles, or equivalently, as a function of disc radius for CAV writing, for high speed writing on unknown recordable optical discs. Of course, the data points may be used to construct FIG. 4 is a graph of power, expressed as beta [%], versus recording velocity, R[m]. By way of comparison, the graph is comprised of two curves, a first curve, labeled "A1", illustrating a prior art linear interpolation of predictive beta target data values versus recording velocity, R[m], and a second curve, generated in accordance with invention principles, which is a piecewise linear interpolation of predictive beta target values versus recording velocity R[m], comprised of three segments, respectively labeled B1, B2 and B3, and referred to hereafter as inventive curve "B".

Figure 1:
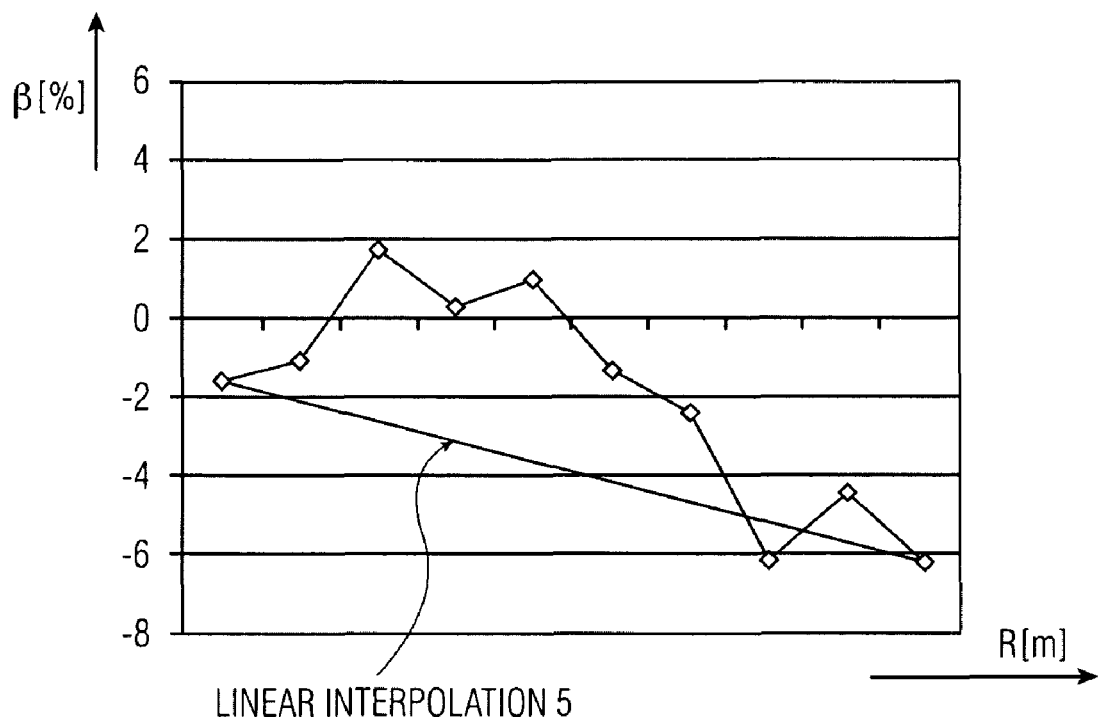
FIG. 1 is a graph representing a relation between the writing laser power value and the β value of a typical optical disc, according to the prior art.

Referring now to prior art curve "A1", the linear interpolation is based on two measured beta target endpoint values, which are measurable in the test zone portions 20, 40 of the optical disc (as shown in FIG. 1). The two beta target endpoint values are $\beta t_{6.3x}$, and $\beta t_{16x}$. Prior art curve "A1" predicts the beta target values in the data zone 30 of an optical disc as being linearly distributed versus recording velocity R[m] over the range 6.3x-16x.

The inventor has experimentally determined that the true or actual beta target values in the data zone 40 of the optical disc comprise a non-linear distribution, as illustrated by two experimentally measured points, M1 and M2, measured at respective recording velocities of 8x and 12x. It is noted that the prior art predictive curve is a poor approximation to the true or actual beta target values. For example, it is shown that for the experimentally measured data point M1, which is the true or actual beat target value at R8x, its measured value is approximately −4.2, as viewed on the graph. The predicted value, using the prior art approach, is approximately −1, resulting in a significant delta of −3.2. In sharp contrast to the prior art predicted value, the predicted value according to the invention, BT1, is approximately −4.1, resulting in a delta of −0.1. It is therefore shown that the invention provides an significant improvement in predictive accuracy over the prior art, as evidenced by way of example in FIG. 4.

As shown in FIG. 4, the inventive curve "B" is significantly more predictive of the actual beta target values than the prior art curve "A", which utilizes only a single segment "A1".

Table I is provided to further illustrate that the inventive graph "B" of FIG. 4 is constructed from a set of raw data points including both measured and calculated beta target values, to construct the various piecewise linear segments.

TABLE I

| Inventive graph "B" Segment Label | Starting Segment Endpoint | Ending Segment Endpoint | Recording velocity range predicted |
|---|---|---|---|
| B1 | $\beta t_{6.3x}$ measured value | $\beta t_{8x}$ computed value | 6.3x-8x |
| B2 | $\beta t_{8x}$ computed value | $\beta t_{12x}$ computed value | 8x-12x |
| B3 | $\beta t_{12x}$ computed value | $\beta t_{16x}$ measured value | 12x-16x |

As shown in Table I, a first piecewise linear segment B1 of inventive graph B (row 1) is constructed from a starting segment endpoint value of $\beta t_{6.3x} = \beta t_{in\_63x}$, which is a measurable value in the test region of the optical disc. The ending segment endpoint value is a calculated value, calculated in accordance with equation (4) above, which is a particular application of general equation (1).

The second segment B2 of inventive graph B (row 2) uses two calculated values, one for the starting segment endpoint $\beta t_{8x}$ and one for the ending segment endpoints, $\beta t_{12x}$.

The third segment B3 of inventive graph B (row 3) uses a combination of calculated and measured values for the respective starting and ending segment endpoints. Specifically, the starting segment endpoint is a calculated value, $\beta t_{12x}$, and the ending segment endpoint is a measured segment endpoint $\beta t_{16x}$.

In the described exemplary embodiment, two beta target values were calculated at respective inner recording velocities of 8× and 12× to yield a three-segment piecewise linear interpolation of predictive beta target values, as illustrated in FIG. 4. It should be understood, however, that there is no limitation in the invention regarding the number of beta target values that may be calculated at the inner recording velocities to perform the prediction. Of course, it is understood that there is a direct correspondence between the number of beta target values calculated and the predictive accuracy. Further, while the invention has been described, in the exemplary embodiment, with respect to performing a piecewise linear interpolation on the raw data points (i.e., measured and calculated beta values), it is understood that the predictive values may be computed using any well known curve fitting method to derive the predicted values from the raw data points, which may or may not pass directly through the raw data points.

It will be appreciated that the present invention is applicable to any optical recording medium where an optimum laser power is desired for writing information to the medium. For example, the present invention is applicable, but not limited to, CD-R(W), DVD+R(W), DVD-R_DL, DVD-RW_DL, and Blu-ray Disc, etc. Those skilled in the art will know how to modify the above embodiment for higher or lower speeds than 16× CAV recording or for P-CAV or Z-CLV recording.

Although this invention has been described with reference to particular embodiments, it will be appreciated that many variations will be resorted to without departing from the spirit and scope of this invention as set forth in the appended claims. The scope of the invention is indicated in the appended claims, and all changes that come within the meaning and range of equivalents are intended to be embraced therein. The specification and drawings are accordingly to be regarded in an illustrative manner and are not intended to limit the scope of the appended claims.

In interpreting the appended claims, it should be understood that:
a) the word "comprising" does not exclude the presence of other elements or acts than those listed in a given claim;
b) the word "a" or "an" preceding an element does not exclude the presence of a plurality of such elements;
c) any reference signs in the claims do not limit their scope;
d) several "means" may be represented by the same item or hardware or software implemented structure or function;
e) any of the disclosed elements may be comprised of hardware portions (e.g., including discrete and integrated electronic circuitry), software portions (e.g., computer programming), and any combination thereof;
f) hardware portions may be comprised of one or both of analog and digital portions;
g) any of the disclosed devices or portions thereof may be combined together or separated into further portions unless specifically stated otherwise; and
h) no specific sequence of acts is intended to be required unless specifically indicated.

The invention claimed is:

1. A method for predicting beta as a function of linear speed for CAV profiles, or disc radius for CAV writing, for writing electronic data on an optical disc, comprising the steps of:
(a) performing a plurality of test recordings of signals in an outer test zone (40) of said optical disc at a plurality of predetermined recording velocities, wherein the test recordings is expressed in terms of an outer test zone measured beta target value obtained from a read laser beam reflected back from the power of a writing laser beam;
(b) calculating at least one beta target values in a data zone (30) of said optical disc at a predetermined recording velocity, and using the at least one calculated beta target value and at least two outer test zone measured beta target values as input to a curve fitting method for predicting beta (power) as a function of linear speed for continuous angular velocity (CAV) speed profiles, or equivalently, as a function of disc radius for CAV writing, for high speed writing on said optical disc; and
(c) predicting beta (power) as a function of linear speed for continuous angular velocity (CAV) speed profiles, or equivalently, as a function of disc radius for CAV writing, for high speed writing on said optical disc, for other linear speeds than the predetermined recording velocities, the predicting depending on the at least one calculated beta target value and the test recordings including test recordings at least two different predetermined recording velocities.

2. The method of claim 1, wherein said step (c) further comprises calculating the at least one beta target value inside said data zone (30) in accordance with the following equation:

$$\beta t_x = \beta t_{out\_x} + \Delta\beta \cdot \frac{\text{Ropc\_out} - R_x}{\text{Ropc\_out} - \text{Ropc\_in}}$$

where $R_{opc\_out}$ and $R_{opc\_in}$ represent the radius of the outside and inside test areas of the optical disc, respectively,
where $\Delta\beta$ represents the difference between beta at the inside and outside disc radius at a certain speed,
wherein $\beta t_{out\_x}$ is a beta target value measured at the outer test zone (40) at a recording velocity x, and
wherein $R_x$ represents a disc radius where the recording is performed at a particular moment.

3. The method of claim 2, wherein where $\Delta\beta$ is calculated in accordance with the following equation:

$$\Delta\beta = \beta t_{in\_opc} - \beta t_{out\_opc}$$

4. The method of claim 2, wherein the term $$\Delta\beta \cdot \frac{\text{Ropc\_out} - R_x}{\text{Ropc\_out} - \text{Ropc\_in}} \text{ is}$$

dependent on certain mechanical features of said optical disc.

5. The method of claim 2, wherein the term $\beta t_{out\_x}$ is dependent on a recording velocity of said optical disc.

6. The method of claim 1, wherein the curve fitting method is a piecewise linear interpolation.

7. The method of claim 1, wherein the optical disc comprises one of CD-R, CD-RW, DVD-R, DVD-RW, DVD-R_DL, DVD-RW_DL, DVD+R, DVD+RW, DVD+R_DL, DVD+RW_DL, DVD-RAM or Blue-Ray discs.

8. Apparatus for predicting beta as a function of linear speed for CAV profiles, or disc radius for CAV writing, of an optical disc, for writing electronic data on said optical disc, the apparatus comprising:
means for performing a plurality of test recordings of signals in an outer test zone (40) of said optical disc at a plurality of predetermined recording velocities, wherein the test recordings is expressed in terms of an outer test zone measured beta target value obtained from a read laser beam reflected back from the power of a writing laser beam;

means for calculating at least one beta target values in a data zone (30) of said optical disc at a predetermined recording velocity, and using the at east one calculated beta target value and at least two outer test zone measured beta target values as input to a curve fitting method for predicting beta (power) as a function of linear speed for continuous angular velocity (CAV) speed profiles, or equivalently, as a function of disc radius for CAV writing, for high speed writing on said optical disc and means for predicting beta (power) as a function of linear speed for continuous angular velocity (CAV) speed profiles, or equivalently, as a function of disc radius for CAV writing, for high speed writing on said optical disc, for other linear speeds than the predetermined recording velocities, the predicting depending on the at least one calculated beta target value and the test recordings including test recording at least two different predetermined recording velocities.

9. Apparatus as claimed in claim 8, wherein said means for predicting a range of beta target values inside said data zone (30) using the at least one calculated beta target value and the at least two test recordings at different predetermined recording velocities, further comprises means for performing a curve fitting to predict a range of beta target values using the at least one calculated beta target value and the at least two test recordings at different predetermined recording velocities.

10. The apparatus of claim 9, wherein the curve fitting is a piecewise linear interpolation.

11. A computer program product in one or more non-transitory computer-readable storage media, comprising program code means that, when executed by a computer, causes the computer to perform actions of:

means for performing a plurality of test recordings of signals in an outer test zone (40) of said optical disc at a plurality of predetermined recording velocities, wherein the test recordings is expressed in terms of an outer test zone measured beta target value obtained from a read laser beam reflected back from the power of a writing laser beam;

means for calculating at least one beta target values in a data zone (30) of said optical disc at a predetermined recording velocity, and using the at least one calculated beta target value and at least two outer test zone measured beta target values as input to a curve fitting method for predicting beta (power) as a function of linear speed for continuous angular velocity (CAV) speed profiles, or equivalently, as a function of disc radius for CAV writing, for high speed writing on said optical disc and means for predicting beta (power) as a function of linear speed for continuous angular velocity (CAV) speed profiles, or equivalently, as a function of disc radius for CAV writing, for high speed writing on said optical disc, for other linear speeds than the predetermined recording velocities, the predicting depending on the at least one calculated beta target value and the test recordings including test recording at least two different predetermined recording velocities.

12. The method of claim 1 including performing a test recording of a signal in an inner test zone (20) of said optical disc at a predetermined recording velocity, wherein the test recording is expressed in terms of an inner test zone measured beta target value obtained from a read laser beam reflected back from the power of a writing laser beam and the prediction depends on the inner test zone measured beta target value.

13. A method for predicting beta as a function of linear speed for CAV profiles, or disc radius for CAV writing, for writing electronic data on an optical disc, comprising the steps of:

(a) performing a plurality of test recordings of signals in an outer test zone (40) of said optical disc at a plurality of predetermined recording velocities, wherein the test recordings is expressed in terms of an outer test zone measured beta target value obtained from a read laser beam reflected back from the power of a writing laser beam;

(b) calculating at least one beta target values in a data zone (30) of said optical disc at a predetermined recording velocity; and (c) predicting beta (power) as a function of linear speed for continuous angular velocity (CAV) speed profiles, or equivalently, as a function of disc radius for CAV writing, for high speed writing on said optical disc, for other linear speeds than the predetermined recording velocities, the predicting depending on the at least one calculated beta target value and the test recordings including test recordings at least two different predetermined recording velocities wherein said step (c) further comprises calculating the at least one beta target value inside said data zone (30) in accordance with the following equation:

$$\beta t_x = \beta t_{out\_x} + \Delta\beta \cdot \frac{\text{Ropc\_out} - R_x}{\text{Ropc\_out} - \text{Ropc\_in}}$$

where $R_{opc\_out}$ and $R_{opc\_in}$ represent the radius of the outside and inside test areas of the optical disc, respectively, and where $\Delta\beta$ represents the difference between beta at the inside and outside disc radius at a certain speed.

14. The method of claim 13, wherein where $\Delta\beta$ is calculated in accordance with the following equation:

$$\Delta\beta = \beta t_{in\_opc} \beta t_{out\_opc}$$

15. The method of claim 13, wherein the term $$\Delta\beta \cdot \frac{\text{Ropc\_out} - R_x}{\text{Ropc\_out} - \text{Ropc\_in}} \text{ is}$$

dependent on certain mechanical features of said optical disc.

16. The method of claim 13, wherein the term $\beta t_{out_x}$ is dependent on a recording velocity of said optical disc.

* * * * *